United States Patent
Iliescu et al.

(10) Patent No.: US 7,040,981 B2
(45) Date of Patent: May 9, 2006

(54) LAMINATE SHEET FOR SECURITY BOOKLETS AND METHOD FOR MAKING SAME

(75) Inventors: Ilie Iliescu, Nepean (CA); David N. C. Cruikshank, Kanata (CA); Kevin J. Stille, Ottawa (CA)

(73) Assignee: Canadian Bank Note Company, Limited, Ottawa (CA)

( * ) Notice: Subject to any disclaimer, the term of this patent is extended or adjusted under 35 U.S.C. 154(b) by 0 days.

(21) Appl. No.: 10/798,204

(22) Filed: Mar. 11, 2004

(65) Prior Publication Data

US 2005/0202249 A1    Sep. 15, 2005

(51) Int. Cl.
*B42D 15/00* (2006.01)
*B42B 5/00* (2006.01)
*B32B 9/04* (2006.01)

(52) U.S. Cl. ............ 462/903; 283/74; 428/411.1; 428/412; 428/475.5; 412/1; 412/6

(58) Field of Classification Search ........... 428/412, 428/474.4, 475.5, 411.1; 462/903; 412/1, 412/4, 6; 281/38; 283/74
See application file for complete search history.

(56) References Cited

U.S. PATENT DOCUMENTS 3,301,295 A * 1/1967 Fitch ................. 190/100
4,661,395 A * 4/1987 Akao ................. 428/213
6,135,503 A * 10/2000 Lob et al. ............ 283/63.1
6,213,702 B1 * 4/2001 Wesselink ............. 412/1

FOREIGN PATENT DOCUMENTS

EP    1245407 A2 * 10/2002
EP    1380442 A1 *  1/2004
WO   WO 98/19870   *  5/1998

* cited by examiner

*Primary Examiner*—Thao Tran
(74) *Attorney, Agent, or Firm*—Brinks Hofer Gilson & Lione

(57) ABSTRACT

A hard laminate sheet for security booklets and method of making the same. The laminate sheet comprises at least two hard core layers (e.g. of polycarbonate) and a flexible component (e.g. nylon) there between and extending beyond an outer edge of the core layers to form a flexible band. The flexible component may be provided as an intermediate layer also comprising a hard component (e.g. of polycarbonate) juxtaposed with the flexible component and laminated to the adjacent core layers. The flexible component comprises a plurality of apertures within which material of the adjacent core layers is laminated together and affixes the flexible component to the laminate sheet. Additional hard core layers may be laminated to the core layers which sandwich the intermediate layer. Optionally, the laminate sheet may be used for a travel document (such as a passport) and may be laser engraved. Also, optionally, the laminate sheet may comprise a hard core inlay layer configured for containing a contactless integrated circuit chip and antenna or other electronic hardware.

19 Claims, 2 Drawing Sheets

LAMINATE SHEET FOR SECURITY BOOKLETS AND METHOD FOR MAKING SAME

FIELD OF THE INVENTION

This invention relates generally to the field of security documents in the form of a booklet having multiple pages bound together by suitable means, and in particular to a laminate sheet for inclusion as a page of such a booklet.

BACKGROUND OF THE INVENTION

Security booklets, such as travel documents (e.g. passports), typically comprise multiple pages which are bound together along an edge of the booklet (for example, by sewing sheets together down the middle and then folding them at the sewing line) one such page typically being a machine-readable information sheet in accordance with ICAO (International Civil Aviation Organization) specifications and comprising various printed security features, a photograph and other personal information identifying the document holder. More recently, this information sheet, or another information sheet of the security booklet, may comprise an embedded contactless integrated circuit chip and antenna which form part of a security system designed to enhance the level of security associated with the travel document. Similarly, another information sheet of the security booklet could be used as a carrier for other high capacity electronic storage media such as contact-based integrated circuit chips, magnetic strips and optical memories.

Depending on the function and composition of the information sheet it may be necessary, or desirable, that it be made of a hard and durable synthetic material differing substantially in character from the remaining pages of the booklet which, typically, are comprised of a soft and pliable paper that can be sewn together and withstand repetitive bending and flexing at the bound edge. This is because of certain improved security measures which may now be applied to the personification of such security booklets, such as the use of laser engraving and/or the use of a contactless integrated circuit chip and antenna embedded within the information sheet itself. These improved security measures require that such an information sheet be hard, durable and thicker than the accompanying paper sheets with which it must be bound and, in turn, the harder, thicker character of such information sheet presents a problem as to how to durably and securely bind them within the booklet.

This problem arises because a hard, durable sheet material cannot be satisfactorily bound, at one of its edges, with pliable sheets, so as to form part of a travel document such as a passport. Such materials are too hard for the sewing process and cannot be folded as needed for the sewing/binding process. Moreover, a hard material fixed into the binding would not be able to withstand the normal, day-to-day, flexing and bending that travel documents may be subjected to over the term of their use.

To overcome this problem, it is necessary to find a method of securely binding a hard, durable sheet, capable of functioning as an information sheet, to a flexible band that can be effectively bound into a booklet and provide the required flexibility and durability, for usage, at the binding edge. If like materials are selected for the durable sheet and flexible binding edge portion, these can be laminated together to form the desired construction having such a flexible edge piece for binding into a booklet, an example of such a construction being European Patent Application No. EP 1,245,407 of Setec Oy published on 27 Mar. 2002. However, where dissimilar materials are desired for the durable sheet and the binding edge, lamination may not provide an acceptable option since dissimilar materials may not effectively laminate to each other.

U.S. Pat. No. 6,213,702 to Wesselink, issued 10 Apr. 2001, discloses a possible solution to such problem posed by dissimilar materials, whereby a flexible band is affixed to a finished synthetic, hard sheet, referred to as a plate, by means of a separate joining strip positioned over the band. The joining strip is configured with projections to mechanically fit into mating perforations formed along the edge of the flexible band which is positioned over the hard sheet, such that the only direct connection made is between the joining strip and the plate, the connecting surfaces being the bottom surfaces of the projections and the top surfaces of the plate exposed by the perforations in the band. Those connecting surfaces of the separate joining strip and the plate are affixed by means of either a mechanical clamping fit between the projections and perforations or by fusing them together (i.e. by melting them together by ultrasonic welding if the material used for the joining strip is the same as that of the plate). However that possible solution has the disadvantage of requiring use of a separate joining strip.

European Patent Application No. EP 1,380,442 of Setec Oy, published on 14 Jan. 2004, and U.S. Pat. No. 6,135,503 to Lob et al., issued on 24 Oct. 2000, each disclose an identification document comprising a durable data sheet with a more flexible edge for binding with additional booklet sheets, whereby the durable sheet is formed by laminating plastic layers together in the data area of those sheets but preventing such lamination from occurring at the edges of those sheets by providing intermediary separation layers between them in only that edge area. Thus, these methods require the step of specifically positioning such intermediary separation layers in the edge area.

Accordingly, there remains a need for means to securely couple together dissimilar first and second materials, one being a hard, core material and the other being a flexible material suitable to be bound with paper sheets by sewing them together, without any need for a separate joining component or separate separation layers.

SUMMARY OF THE INVENTION

In accordance with the invention there is provided a hard laminate sheet for security booklets, comprising at least two hard core layers and a flexible component there between and extending beyond an outer edge of the core layers to form a flexible band. The flexible component may be provided as an intermediate layer comprising a hard component juxtaposed with flexible component and laminated to the adjacent core layers. The flexible component comprises a plurality of apertures within which material of the adjacent core layers is laminated together and affixes the flexible component to the laminate sheet. Preferably, a plurality of additional hard core layers are directly or indirectly laminated to the two core layers which sandwich the flexible component (or intermediate layer). The core layers, and hard component of the intermediate layer, may, optionally, comprise polycarbonate. The flexible component may, optionally, comprise nylon.

For selected applications the laminate sheet may be preferably configured for laser engraving and/or may comprise a hard core inlay layer for embedding a contactless integrated circuit chip and antenna.

In accordance with a further aspect of the invention there is provided a method for making a hard laminate sheet for security booklets, comprising the steps of providing at least two hard core layers (e.g. Of polycarbonate) and a flexible component (e.g. Of nylon) positioned there between arid extending beyond an outer edge of the core layers to form a flexible band, whereby the flexible component comprises a plurality of apertures. The flexible component may be provided as an intermediate layer comprising a hard component (e.g. Of polycarbonate) juxtaposed with the flexible component. These layers are then laminated to produce core-to-core bonds between the adjacent hard core layers (including the hard component of the intermediate layer) and a core-to-core bond within the apertures of the flexible component from material of the core layers adjacent the flexible component such that that core-to-core bond, within the apertures, affixes the flexible component to the laminate sheet. Preferably, a plurality of hard core layers are directly or indirectly laminated to the core layers sandwiching the flexible component.

DESCRIPTION OF THE DRAWINGS

The present invention is described below with reference to the following drawings in which like reference numerals refer throughout to like elements.

DESCRIPTION OF THE ILLUSTRATED EMBODIMENT

The inventors herein have developed a method for making a hard, durable synthetic page (interchangeably also referred to herein as a laminate sheet) comprised of a composite laminate of hard core material layers of which two such layers encase a flexible material layer such that a flexible band is formed and extends from the laminate sheet. As a whole, the laminate sheet advantageously constitutes a secure, tamper-resistant monolithic structure suitable for use in a security document such as a travel document. This method, and the security booklet produced therefrom, are described below with reference to an embodiment illustrated by the drawings.

The use of a hard, durable synthetic sheet, for example a polycarbonate sheet, within security booklets is becoming increasingly desirable because such materials provide greater security than paper sheets; they can be laser engraved with personal details of the booklet holder and can provide a durable shell for an embedded contactless integrated circuit chip (where desired). However, such use presents difficulties for the manufacturing of security booklets because a hard page cannot itself be directly bound within a booklet; instead, it becomes necessary to securely coupled such hard page to a flexible band whereby such flexible band is directly bound (e.g. by sewing) to the other pages of the booklet.

As will be recognized by persons skilled in the art, the task of laminating or gluing together two dissimilar materials, such as a hard, polycarbonate material and a flexible material such as nylon, is problematic if it is desired to achieve a secure bond between the dissimilar materials i.e. so that they cannot be peeled away from each other (for obvious reasons, any propensity for such peeling away between layers of the sheet materials is not acceptable for security document applications). Consequently, in order to couple a flexible band material, of a type that can be sewn into a security booklet, to a hard core laminate sheet it is desirable to avoid any direct coupling of those dissimilar materials. The aforementioned U.S. Pat. No. 6,213,702 to Wesselink provides a means of indirect coupling of such dissimilar materials using a separate joining strip. By contrast, the inventors herein have developed means to achieve the necessary indirect coupling without need for any such additional component.

Figure 1:
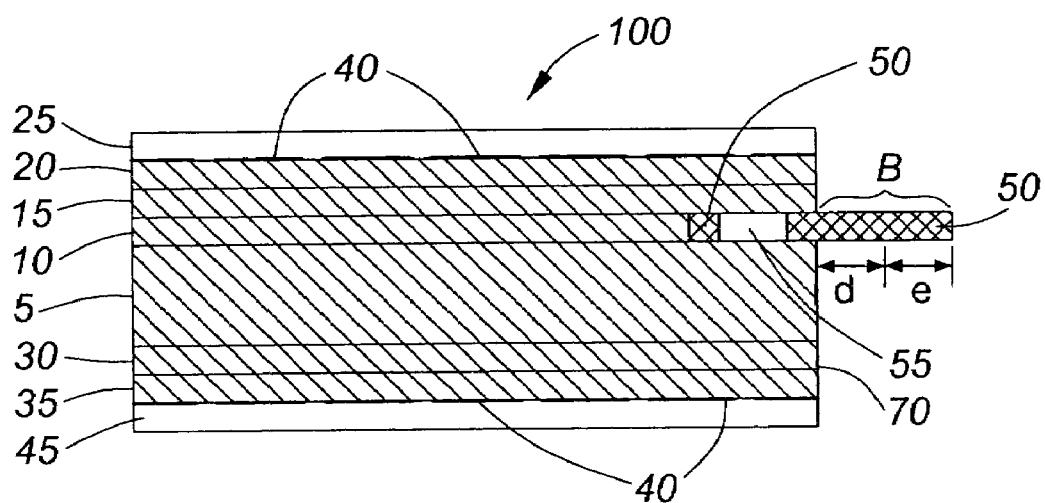
FIG. 1 is a cross-sectional view of a hard, durable, composite, laminate sheet having an integral flexible band extending therefrom, showing the core laminate and flexible band layers arranged in accordance with the invention.
Figure 2:
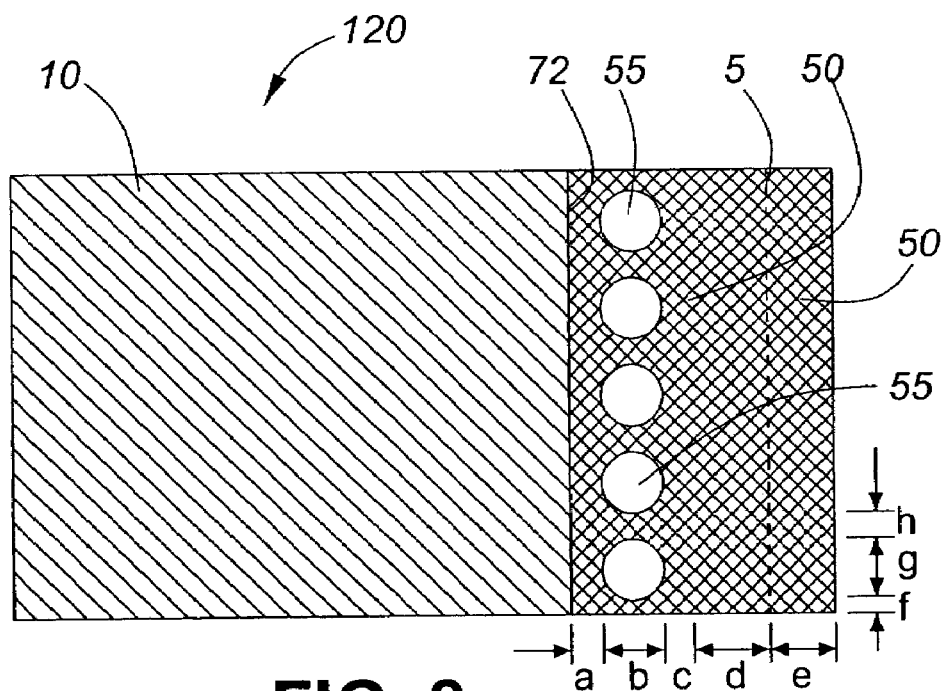
FIG. 2 is a plan view of an intermediate layer of the composite, laminate sheet of FIG. 1, this intermediate layer being made up of separate, juxtaposed components each comprised of a different material, one being the hard, durable core material and positioned on the left-hand-side, and the other being the flexible material of the band and positioned adjacent the core material component on the right-hand-side thereof, the flexible material component including a plurality of spaced apertures along an edge adjacent the core material component.

Referring to FIGS. 1 and 2, these drawings show, respectively, a cross-sectional view of a hard synthetic page 100 according to the invention and a plan view of an intermediate layer 120 thereof which provides a flexible component 50, with a flexible band, according to the invention. The hard synthetic page 100 is a composite laminate sheet made from a plurality of core material layers laminated together, in this embodiment the core material layers being layers 5, 10, 15, 20, 25, 30, 35 and 45. Between the core material layers 15 and 5 an intermediate layer 120, comprising the flexible component 50, is provided. In this embodiment, the intermediate layer 120 includes a hard component 10 in addition to the flexible component 50. As illustrated, the component 10, positioned on the left-hand-side, is made of the hard core material that is laminated and is juxtaposed with component 50, positioned adjacent thereto on the right-hand-side, which is made of the flexible material. As may be best seen by FIG. 2, the flexible material component 50 includes a plurality of spaced apertures 55 along an inner edge 72 thereof and extends beyond an outer edge 70 of the laminate sheet 100 to provide a flexible band B that can by sewn into a security booklet. As shown, the flexible band B has a width equal to distances "d" plus "e".

The hard synthetic page 100 has the characteristic of a secure, monolithic structure and, as such, it is suitable for incorporation into a travel document together with the paper pages typically present that type of security booklet. It is a multi-layer laminate of the hard core material, produced as described herein, so as to integrally combine a flexible band material therein without any direct core-to-flexible material coupling. Advantageously, the flexible material is itself neither welded nor glued and, therefore, any material having the desired flexibility, pliability, etc. can be selected for use.

For use in a security booklet, the flexible material of component 50 should be selected to be flexible, pliable and durable so that it may act as a hinge without breaking, tearing or otherwise becoming damaged over the expected period (e.g. five years) and manner of use of the booklet. The selected material for layer 50 should preferably also be selected to be soft and thin so that it can be sewn to the other pages of the booklet in the usual manner using conventional book binding equipment.

Figure 4:
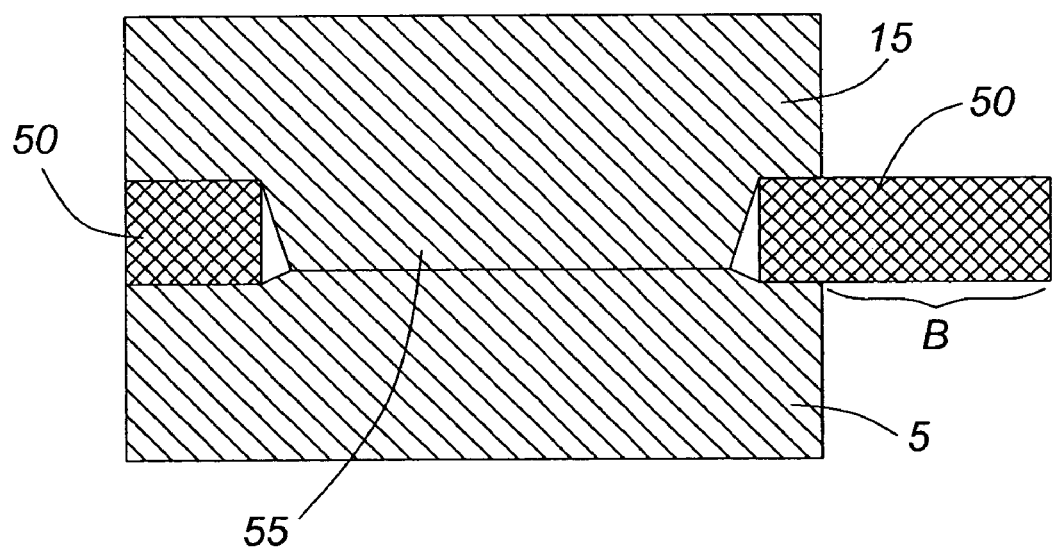

Further, the material to be selected for layer 50 must have a higher melting temperature than that of the core laminate material used for layers 15 and 5 which encase layer 50 so as to ensure that the flexible material does not melt to either of layers 15 and 5. Instead, when the core material layers are laminated, the material of layers 15 and 5 in the area above and below the apertures 55 of the flexible material layer 50 is caused to melt and flow together to bond within the area of the apertures 55 and thereby encase the flexible material component 50. This is illustrated by FIG. 4. At the time of laminating the core material layers, the adjacent core material layer 10 also melts and bonds with the sandwich layers 15 and 5. As such, the flexible material layer 50, including the band B, becomes encased and integrally, securely formed within the hard synthetic sheet 100 and is secure and tamper resistant within that structure. Preferred materials for the flexible component 50 will maintain their form, flexibility and strength at the temperatures required to laminate the core material, examples of which include polyamide (i.e. nylon) and Melinex brand polyester film supplied by DuPont Teijin Films. Although, several synthetic materials, such as polypropylene are thin and flexible, they may not be suitable where they are unable to maintain their form during heat lamination.

The hard synthetic page 100 is constructed of a plurality of layers of material. For the embodiment shown by FIG. 1, these are layers 25, 20, 15, 120 (comprising layers 10 and 50), 5, 30, 35 and 45, but it is to be understood by the reader that the invention is not limited to the illustrated exemplary embodiment and, to the contrary, may be implemented in numerous alternative forms using a different number and thicknesses of layers as may be suitably selected for a given application. The layers 25, 20, 15, 10, 5, 30, 35 and 45 of the illustrated embodiment are made of the same material, or sufficiently similar material (in terms of achieving the required lamination) and this material is referred to herein as the page core material. For the illustrated embodiment, this page core material is selected to be polycarbonate. As shown, layers 25 and 45 are clear and layers 20, 15, 10, 5, 30 and 35 are white. The material selected for layers 25 and 45 is MakrofollD 6-2 brand laser-engravable polycabonate supplied by the Bayer Company. For layers 20, 15, 10, 5, 30 and 35 the material selected is MakrofollD 4-4. When laminated together (without adhesive) at an appropriate temperature, pressure, and time, as may be readily determined by persons skilled in the art, these core material layers form a core-to-core bond which is secure (meaning that any attempt to dissect the layers would be difficult and such tampering would be evident upon viewing the page) and durable.

Polycarbonate, used for the core material, provides good protection against bending, impact and other stresses that the synthetic page 100 will likely encounter. However, it is to be understood by the reader that although polycarbonate is selected for use in the illustrated embodiment, the invention may, alternatively, be implemented using a range of other materials providing the desirable characteristic of hardness, durability, etc., including PVC (polyvinyl chloride) and PETG (glycol modified polyethylene terephthalate). If desired, for an alternative embodiment, adhesives could be used between the multiple layers forming the synthetic page 100 and, also, dissimilar materials (provided that such adhesives adhere to each such material) could be used for the page core material, but such alternatives are not desirable and would be expected to result in a synthetic page of lesser durability and security than that of the preferred embodiment produced by laminating page core layers of the same material.

In the preferred embodiment, as shown by FIG. 1, layers 20 and 35 include lithographic security printing 40. So, for this embodiment, the page core materials used for these layers must be litho-printable i.e. such that good quality security printing is obtained, and the inks used for the printing must be able to withstand the temperatures required for laminating these materials to achieve core-to-core bonding. These layers 20 and 35 are security printed and are provided in sheets. The outer layers 25 and 45 are, optionally, included to form a protective overlay for the security printing on layers 20 and 35.

In the illustrated embodiment, layer 15 is included such that the combined thickness of layers 25, 20 and 15 provides sufficient strength to withstand tearing when any attempt is made to remove layer 15, whereby a combined thickness of 300 microns is adopted for this embodiment. The illustrated use of two layers, 15, 20, rather than using one layer only of the combined thickness of the two layers, is a preferred option for this embodiment in order to reduce costs when the material of the layer having lithographic printing thereon is spoiled during the printing process.

Figure 3:
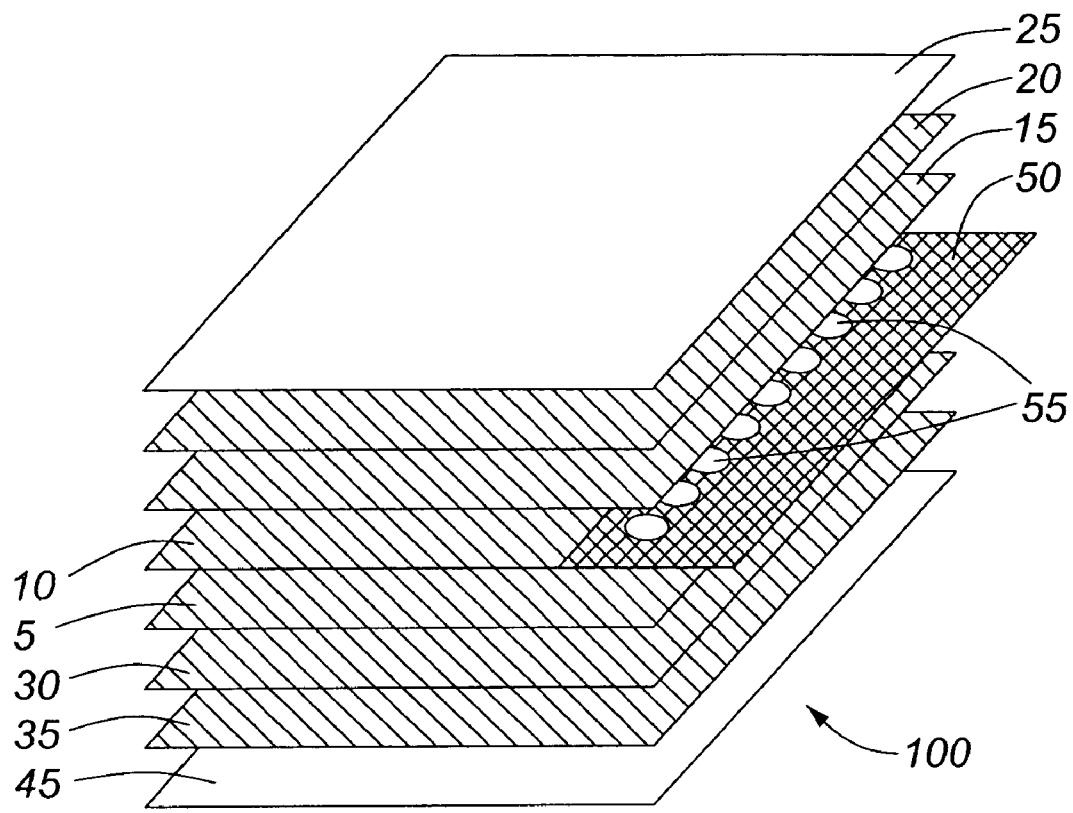
FIG. 3 is an exploded view representation of the composite, laminate sheet of FIG. 1, showing the relative positioning of each layer thereof including the intermediate layer comprising the flexible material of the band shown separately by FIG. 2; and, FIG. 4 is a schematic, conceptual-type illustration which is provided to illustrate an integration of the flexible band component of the intermediate layer into the composite, laminate sheet whereby the adjacent core material layers positioned above and below the flexible band component have melted into and combined within the area of the apertures of the flexible band component.

The illustrated use of separate layers 5 and 30 as shown in FIGS. 1 and 3 is optional, for use when it is desirable to provide a combined layer that can function as an inlay for containing, for example, a contactless chip, chip module, antenna and attachments (not illustrated). For such applications the thicknesses of the layers are governed by the dimensions of the chip components and the inlay may be provided by an inlay manufacturer in sheets according to a preselected layout. If such an inlay configuration is not desired, the thickness of these layers may differ, and/or the use of one layer only in place of such separate layers 5, 30 may be adopted, as appropriate for the application, but for all applications each layer adopted for use is comprised of the core material and is laminated with the other core materials layers of sheet 100. A further option that may be desired when using the illustrated inlay configuration is to also affix a thin layer of the same material to opposite sides of 5 and 30 during the making of such inlay.

The intermediate layer 120 of the exemplary embodiment is made of the two components 10 and 50 shown in the drawings. The hard component 10 comprises the core material of laminate sheet 100 such that a core-to-core bond is achieved with layers 15 and 5 during heat lamination. The flexible component 50 provides a flexible band B, in accordance with the invention, which is used to form a connection between the laminate sheet 100 and the other pages of the security booklet. Each of the layers 10 and 50 are cut into strips as shown in FIG. 3. The flexible material of component 50 allows the band B to be connected to the booklet by way of sewing it into the spine of the booklet in the same manner used currently for paper or other synthetic pages such as heat seal laminates. As such, the material of component 50 is selected so that it is thin and pliable enough to be sewn with existing manufacturing equipment, it bends easily when the booklet is opened and closed, and it is durable enough to withstand both the sewing process and the various bends, pulls and other stresses that it will encounter over the life of the security booklet.

The flexible component 50 is connected to the core material layers in the following manner. Apertures 55 are cut or milled out of the flexible component 50 in the area where the joinder with the core material is to occur, as shown best in FIGS. 1 and 2. Flexible component 50 is placed between layers 15 and 5, as shown, and heat lamination is undertaken so that the materials of layers 15 and 5 flow into the cavities of apertures 55 and form a strong core-to-core bond between layers 15 and 5. The shape of apertures 55 defined by bounds (b, g) and the distance (h) between apertures 55, are selected so that an area of sufficient size to achieve that core-to-core bonding between layers 15 and 5 is provided and, at the same time, a sufficient amount of the material of the component 50 remains to be encased by that bonding of layers 15 and 5 to make it difficult to detach the component 50 from the laminate core. In the illustrated exemplary embodiment the selected length (b) is 6.25 mm, the selected length (g) is 6.25 mm and the selected length (h) is 6.0 mm.

The distances (a, c, f) from the boundaries of the apertures to the edges of the flexible component 50 are selected so as to avoid any easy rupturing, by stresses applied to the band B, of the surface of any of layers 25, 20 and 15 and the surface areas of the component 50 material, between layers 15 and 50 and between layers 50 and 5, are minimized because the laminate core material and the flexible band material do not laminate or otherwise securely affix to each other from the heat lamination. In the illustrated exemplary embodiment the selected length (a) is 1.75 mm, the selected length (c) is 1.75 mm and the selected length (f) is 6.0 mm (though the manufacturing of this embodiment can somewhat vary this length (f).

The length (d) of flexible material of component 50 from the edge of the laminate sheet 100 to the spine (marked by "S" in FIG. 2) is selected so that the hard laminate sheet 100 of core material cannot easily be bent against the flexible band B to thereby cause the connection of component 50 to rupture. In the illustrated exemplary embodiment the selected length (d) is 13.0 mm. The length (e) of flexible material of component 50, forming the spine area thereof, is selected so as to minimize the amount of material of band B which extends from the spine on the other side of the booklet. In the illustrated exemplary embodiment the selected length (e) is also 13.0 mm.

The specific number of layers, and thicknesses therefor, to be selected according to the invention are not fixed and no specific layer configuration (number and/or thickness) is required to implement the invention. For the illustrated embodiment shown by the drawings, representing one example only, the following layer thicknesses are selected: layer 25 is 100 μm; layer 20 is 100 μm; layer 15 is 100 μm; layer 10 is 100 μm; layer 50 is 100 μm; layers 5 and 30 (together forming one inlay configuration in this embodiment) are 430 μm; layer 35 is 100 μm and layer 45 is 50 μm.

In manufacture, layers 25 through 45 are gathered and layered in the manner shown in FIG. 3 such that the flexible component 50 extends outside of the stack of layers. The layers are heat welded to maintain their positioning for heat lamination. Then the layers are laminated together at appropriate temperature, pressure and time amounts, as required to form a core-to-core bond of the core materials of the laminate sheet. Depending on variables such as the overall thickness and the surface finish of layer materials, the temperature, pressure and times used for the sheet construction of the illustrated embodiment, of which the core material is polycarbonate (without adhesive), are about 190° C., 100 bar, and 20 minutes, respectively, over a sheet size of 364×582 mm. The resulting laminated sheet is then cut to suitably sized individual sheets for security booklet manufacture by which the sheet is placed in the appropriate position of pages of the security booklet at sewing stations and is sewn together with the other pages of the booklet. Following this, the remaining steps in constructing the security booklet are performed in normal manner, including applying the covers and die-cutting.

Although stated already, it is hereby emphasized that the examples specified above, with reference to the particulars of the illustrated embodiment, of materials that may be selected for use as the laminate core material and flexible band material, are not intended to be comprehensive or limiting in any manner whatsoever, and other material combinations may be selected for use and satisfy the aforesaid functional requirements of those materials. Similarly, a variety of different layer configurations, material thicknesses and lengths, and relative band and aperture geometries may be selected for successful (effective) use without limitation to any exemplary figures disclosed herein with reference only to the exemplary illustrated embodiment.

Persons skilled in the field of security printing will be readily able to apply the present invention to implement various applications of the same. Consequently, it is to be understood that the particular embodiment described herein by way of illustration is not intended to limit the scope of the invention claimed herein by the inventors and defined by the appended claims.

The invention claimed is:

1. A method for making a hard laminate sheet having a flexible band at one side thereof for use in incorporating said sheet into a security booklet, said method comprising the steps of:
   (i) providing one or more hard core sheets as hard core layer(s) of a lower section of said laminate sheet;
   (ii) providing a flexible sheet over at least a portion of said lower section of hard core layer(s) whereby a portion of said flexible sheet extends beyond an outer edge of said lower section to provide said flexible band, said flexible sheet comprising a plurality of apertures in an area of said flexible sheet over said lower section;
   (iii) providing one or more hard core sheets over both said lower section and said flexible sheet portion there over, as hard core layers of an upper section of said laminate sheet, whereby said upper and lower sections are positioned for lamination together; and,
   (iv) laminating said hard core layers to produce core-to-core bonds between adjacent hard core layers and within said apertures of said flexible sheet,
   whereby said core-to-core bonds within said apertures affix said flexible sheet to said laminate sheet, and the outer edges of said upper and lower sections of said laminate sheet are aligned so as to together define the outer edges of said laminate sheet.

2. A method according to claim 1 whereby said flexible sheet is provided over a side portion of said lower section and a partial hard core sheet is provided over an opposite side of said lower section, in juxtaposition with said flexible sheet, whereby said laminating step includes laminating said partial hard core sheet and the outer edges of said partial hard core sheet, except for the outer edge thereof juxtaposed with said flexible sheet, are aligned with the corresponding outer edges of said upper and lower sections of said laminate sheet.

3. A method according to claim 1, whereby a front and back of said laminate sheet, defined by outermost ones of said hard core sheets, are printable up to said outer edge adjacent said flexible band.

4. A method according to claim 2, whereby a front and back of said laminate sheet, defined by outermost ones of said hard core sheets, are printable up to said outer edge adjacent said flexible band.

5. A method according to claim 1 whereby said core layers are comprised of polycarbonate.

6. A method according to claim 2 whereby said core layers are comprised of polycarbonate.

7. A method according to claim 1 wherein said flexible component is comprised of nylon.

8. A method according to claim 2 wherein said flexible component is comprised of nylon.

9. A method according to claim 1 whereby said laminate sheet is configured for laser engraving.

10. A method according to claim 3 and further comprising providing a hard core inlay layer configured for embedding a contactless integrated circuit chip whereby said laminating step includes laminating said inlay layer.

11. A hard laminate sheet made according to the method of claim 1.

12. A hard laminate sheet made according to the method of claim 2.

13. A hard laminate sheet made according to claim 3.

14. A laminate sheet made according to the method of claim 5.

15. A laminate sheet made according to the method of claim 6.

16. A laminate sheet made according to the method of claim 7.

17. A laminate sheet made according to the method of claim 8.

18. A laminate sheet made according to the method of claim 9.

19. A laminate sheet made according to the method of claim 10.

* * * * *